United States Patent [19]

Chynoweth et al.

[11] 4,390,887
[45] Jun. 28, 1983

[54] ELECTROGRAPHIC RECORDING STYLUS

[75] Inventors: William R. Chynoweth, Littleton; Roger D. Erickson, Denver, both of Colo.

[73] Assignee: Honeywell Inc., Minneapolis, Minn.

[21] Appl. No.: 201,769

[22] Filed: Oct. 29, 1980

[51] Int. Cl.³ .......................................... G01D 15/06
[52] U.S. Cl. ................................................ 346/155
[58] Field of Search .................... 346/153.1, 155, 74.5, 346/139 C; 358/300

[56] References Cited

U.S. PATENT DOCUMENTS 4,052,714 10/1977 Peterson ............................... 346/155
4,316,198 2/1982 Erickson ............................ 346/153.1
4,323,927 4/1982 Yuard et al. ..................... 346/155 X Primary Examiner—L. T. Hix
Assistant Examiner—Thomas H. Tarcza
Attorney, Agent, or Firm—Charles J. Ungemach

[57] ABSTRACT

A stylus array for electrographic recording which includes a laminated stack of stylus elements, each separated from the next adjacent stylus element by a non-conductive layer. The stack array of stylus elements is contoured to have a forward end shaped to conveniently fit between the toner shell and a record receiving medium. The rear end of the stylus array is step contoured to provide two levels, to either of which an electrical contact may be made. Preferably the electrical contact is made to one step on alternate ones of the styli and the intermediate styli are connected electrically at the other step thus providing a measure of separation between the electrical connectors. A non-conductive layer is fixed to the lower edge of the stylus array to provide a sliding low-friction surface for engagement with the upper surface of the recording medium.

8 Claims, 4 Drawing Figures

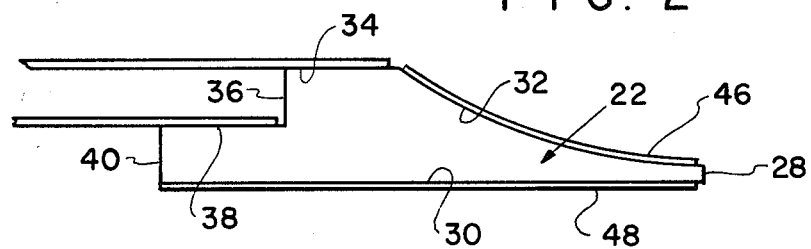
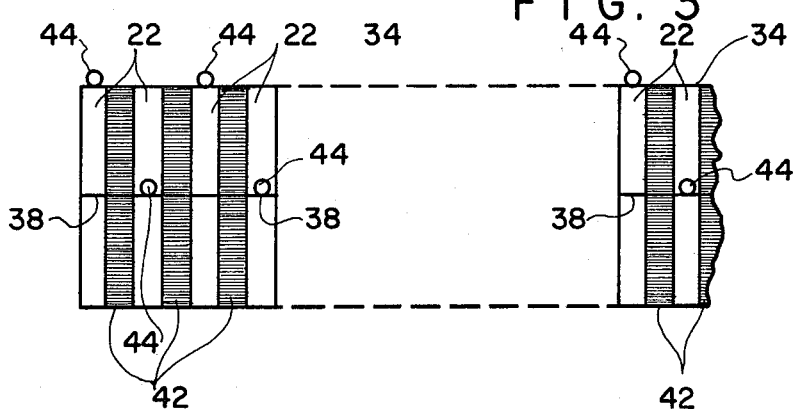
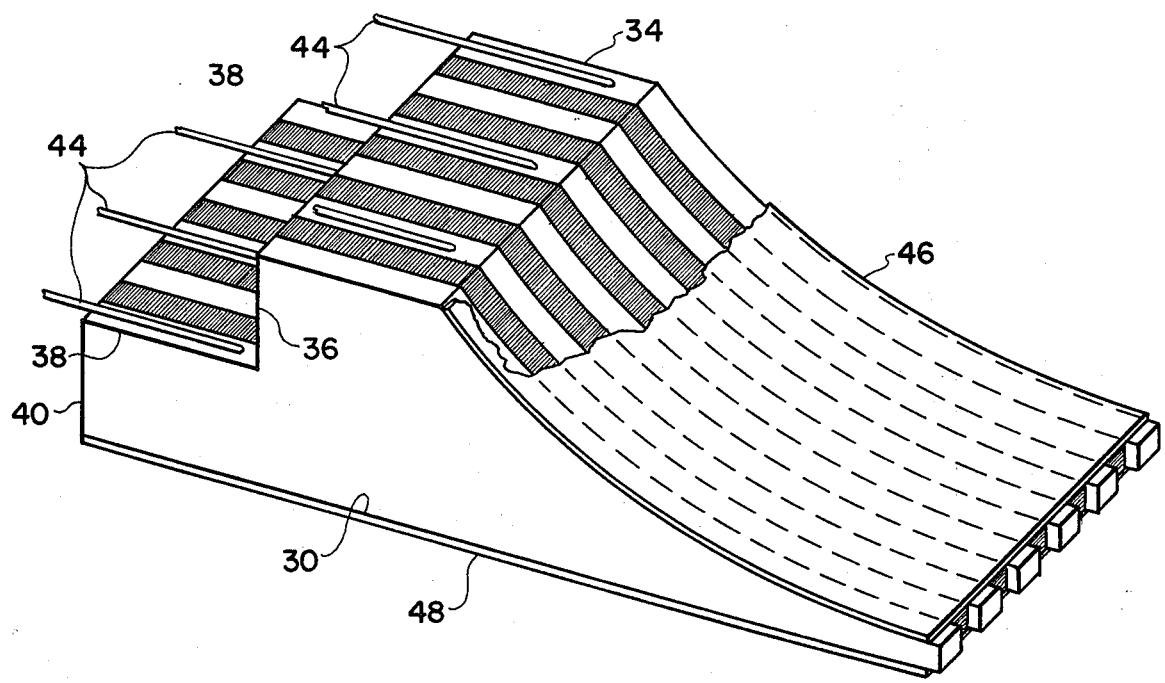

ELECTROGRAPHIC RECORDING STYLUS

CROSS REFERENCE

Cross reference is made to a copending application of Roger D. Erickson, Ser. No. 152,599, filed May 23, 1980 entitled "Electrographic Recording", now U.S. Pat. No. 4,316,198, issued Feb. 16, 1982.

BACKGROUND OF THE INVENTION

The present invention relates to electrographic recording. More particularly, it relates to an improved recording stylus for electrographic recording apparatus. In the above-identified copending application of Roger D. Erickson, there has been disclosed an electrographic recording system which includes means wherein toner powder having electrical and magnetic properties is carried from a hopper to a recording station by a rotatable drum or shell. The shell is rotated about a magnetic core structure which produces a magnetic field to hold the toner powder onto the surface of the shell as it rotates. At the recording station, a dynamic bridge is formed of the toner powder between the periphery of the drum or shell and a magnetically permeable member positioned a predetermined distance from the surface of the drum or shell. A record member is driven along a path between the drum and the permeable member with the reverse side of the record member in contact with the permeable member. An array of recording electrodes are positioned to be in an electrical contact with the toner powder in the bridge. The record member is backed up by a platen member at least a portion of which is electrically conductive. When one or more of the electrodes is energized, a conductive path is established from the electrode, through the bridge, to the surface of the recording member and the conductive back-up platen, electrically charging the dielectric surface of the recording member to deposit toner thereon.

In the system described in the copending application, it is important that the position of a styli relative to the surface of the recording medium be constant. Additionally, in order to achieve a high order of lateral fidelity, it is important that the styli be arranged in a high density array, on the order of 200 to the inch. Such a high density array presents problems of stability of positioning the styli with respect to each other and also to making electrical contacts to each stylus individually.

SUMMARY OF THE INVENTION

It is, accordingly, an object of the present invention to provide an improved stylus structure for electrographic recording apparatus.

It is another object of the present invention to provide an improved stylus structure as set forth which provides stability of the structure itself, stability of the positioning of the stylus relative to the record medium and provides convenient electrical connector means.

In accomplishing these and other objects there has been provided, in accordance with the present invention, a stylus array for electrographic recording which includes a laminated stack of stylus elements, each separated from the next adjacent stylus element by a non-conductive layer. The stack array of stylus elements is contoured to have a forward end shaped to conveniently fit between the toner shell and a record receiving medium. The rear end of the stylus array is step contoured to provide two levels, to either of which an electrical contact may be made. Preferably the electrical contact is made to one step on alternate ones of the styli and the intermediate styli are connected electrically at the other step thus providing a measure of separation between the electrical connectors. A non-conductive layer is fixed to the lower edge of the stylus array to provide a sliding low-friction surface for engagement with the upper surface of the recording medium.

BRIEF DESCRIPTION OF THE DRAWINGS

A better understanding of the present invention may be had from the following detailed description when read in the light of the accompanying drawings in which:

FIG. 2 is a side elevational view of a stylus array constructed in accordance with the present invention;

FIG. 3 is a rear elevational view of the apparatus shown in FIG. 2 and;

FIG. 4 is a symetric view of a stylus array embodying the present invention.

DETAILED DESCRIPTION

Figure 1:
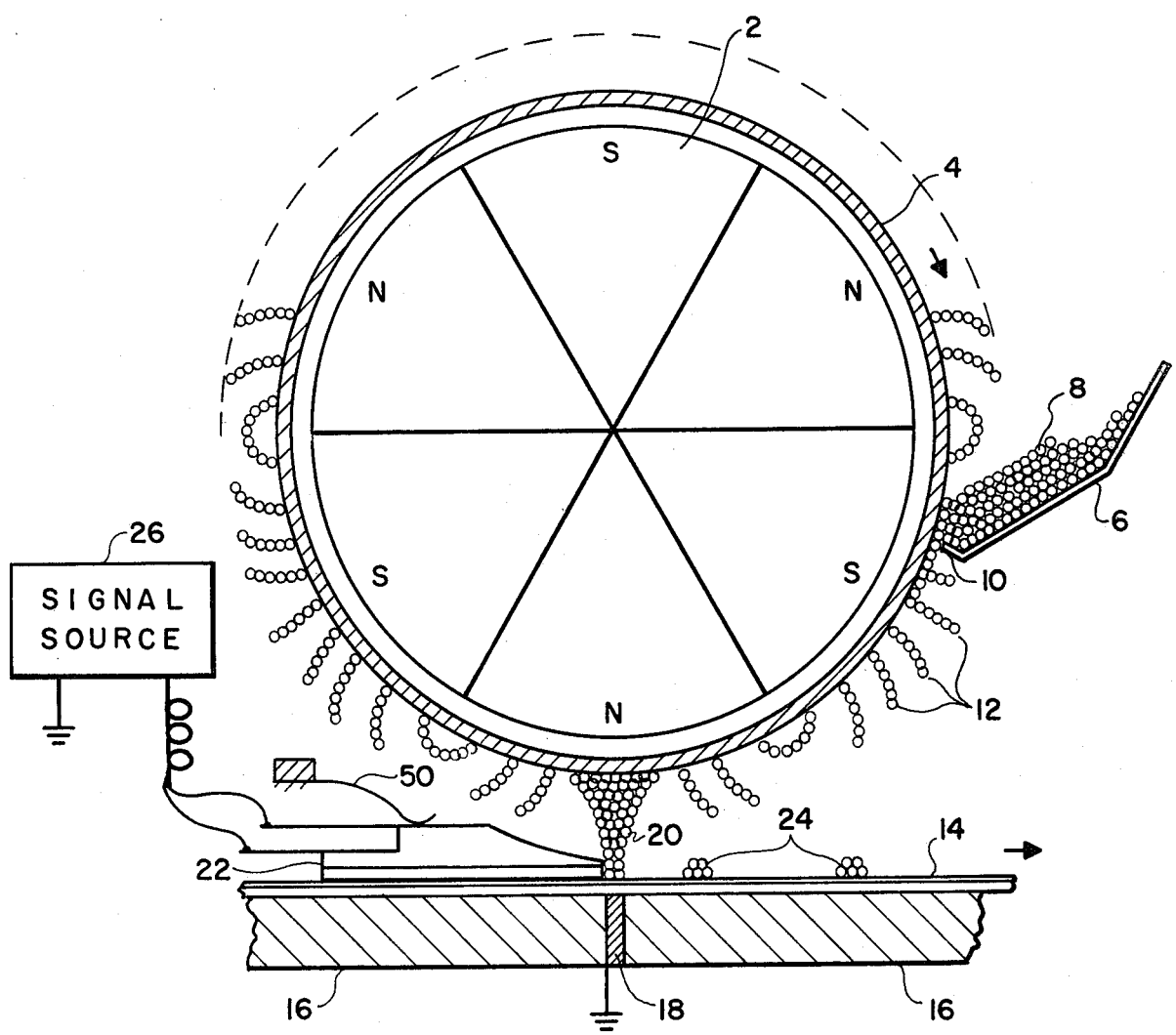
FIG. 1 is a cross sectional view of apparatus embodying the present invention.

Referring now to the drawings in more detail, there is shown in FIG. 1 a recording system wherein a magnetic core structure 2 defines a plurality of alternate magnetic polls above the cylindrical periphery thereof. Surrounding the magnetic core structure is a cylindrical drum or shell 4 formed of non-conductive non-magnetic material. The drum is arranged to be rotationally driven without the magnetic core structure by conventional means (not herein shown). A hopper 6 is positioned adjacent the periphery of the drum 4 and is coextensive therewith. The hopper contains a quantity of toner powder 8. The toner powder is both electronically conductive and magnetically responsive in the manner shown in U.S. Pat. Nos. 3,816,840 - Kotz, 3,879,373 - Lunde, and 3,946,402 - Lunde. The magnetic fields produced by the magnetic core structure 2 causes the magnetic toner particles 8 to be attracted to the surface of the drum 4. The lower edge 10 of the hopper structure 6, the edge adjacent the periphery of the drum 4, constitutes a doctor blade for metering a predetermined quantity of the toner onto the surface of the drum 4. As the toner is moved by the rotating drum past the doctor blade 10, the toner forms whisker-like strings 12 conforming to the pattern of the magnetic fields established by the magnetic core structure 2. Positioned adjacent to but spaced from the outer periphery of the drum 4 is means for defining a path along which a record member 14 is drawn. The record member 14 is preferably in the form of a substrate carrier which is at least slightly electrically conductive and on the surface of which is a dielectric coating. The means defining the path for the record member 14 is a non-magnetic back plate or platen 16. Embedded in the back plate 16 or sandwiched between two segments of the back plate 16 there is positioned a thin magnetically permeable strip 18. The strip is positioned to be parallel to the axis of the drum 4 and with the narrow edge positioned at the point of nearest approach to the surface of the drum 4. This position is defined as the recording station. At least a portion of the back plate opposite the toner bridge must be conductive and make electrical contact with the recording medium opposite the toner bridge; this may be the magnetically permeable strip 18. Alternatively, the back plate 16 itself may be electrically conductive. In either event, the electrically conductive portion of the back plate 16 or the electrically conductive magnetically permeable strip 18 is connected to ground.

The presence of the magnetically permeable strip 18 causes a sharply defined concentration of the magnetic field produced by the magnetic core structure 2 in the space between the drum 4 and the member 18. Since the whisker like strings of the toner particles 12 substantially conform to the pattern of the magnetic field, a highly concentrated sharply defined toner bridge 20 extends between the periphery of the drum 4 and the upper surface of the upper member 14. So long as the drum 4 continues to rotate, magnetic toner particles are constantly being added to and removed from the bridge 20 while the bridge 20 itself remains stabley in position. This is herein referred to as a dynamic bridge. The toner particles removed from the bridge form the string whiskers 12 on the opposite side of the bridge and continue around the drum until they rejoin the toner 8 in the hopper 6. As the record member 14 is drawn past the end of the bridge 20, the toner particles in the bridge brush across the surface of the record member but substantially none of the toner particles are deposited on the surface of the record member since the magnetic field maintains control in the attraction of the toner particles.

In order to effect a recording of data on the record member, an array of conductive electrodes or styli 22 are positioned in the space between the drum 4 and the surface of the record member 14. The electrodes or styli are positioned to intercept and have at least the extremities thereof in physical and electrical contact with the toner in the bridge 20. When an electrical pulse is applied to one or more of the electrodes or styli 22, an electrical charge passes from the electrodes down through the toner bridge to the dielectric surface of the record member 14. That pulse results in an electrostatic charge being placed on the dielectric surface of the record member 14. The electrostatic charge overcomes the magnetic attraction of the particles and causes a deposit 24 of the toner particles on the surface of the record member 14.

In the illustrated embodiment, a signal source means 26 is shown with one set of leads connected respectively, to the several electrodes or styli 22 and with the other lead grounded. The electrically conductive portion of the back plate 16 or the magnetically permeable strip 18 is also grounded. Thus a signal applied to the electrode 22 from a signal source 26 and through the bridge 20 effectively charges the dielectric surface of the record member 14. The opposite charge being applied through the grounded backing means and the conductive backing of the record member 14. The charges thus imposed upon the surface of the record member 14 provides an attractive force for the particles of toner from the bridge 20 to overpower the magnetic attraction and thereby cause a deposit of toner particles 24 to be imposed upon the record member 14 in the pattern of the elemental charges.

As was previously mentioned, the ability to form a record having high lateral definition is a function of the ability to maintain the electrodes 22 in a constant position relative to the surface of the record member 14. Further, with the need for a large number of styli or electrodes 22, it is necessary to provide means for making convenient electrical contact with the individual styli. To this end, there is provided in accordance with the present invention, and most clearly illustrated in FIGS. 2, 3, and 4, a specially contoured stacked array of styli. While, in FIG. 1, the system is illustrated as having a relatively large space between the periphery of the shell 4 and the surface of the record member 14, in practice, that distance is quite small, being on the order of 25 to 30 thousandths of an inch.

The stylus array, in accordance with the present invention, comprises a plurality of individual stylus elements formed of a conductive material, preferably non-magnetic, and formed of very thin sheet material. The individual styli are contoured to have a very narrow or small operating tip 28. Each stylus is provided with a straight flat lower edge defining a reference plane 30. The upper edge of each of the styli 32 slopes upwardly, preferably along a curvilinear path to a maximum dimension substantially larger than the operating tip 28 with respect to the reference plane 30. At the upper end of the curved sloping portion 32 there is a flat surface 34 substantially parallel to the reference plane 30. The flat surface 34 terminates in a vertical edge 36, which in turn terminates in a second flat surface 38 approximately halfway between the surface 34 and the referenced plane 30 and substantially parallel to both of those surfaces. The second flat surface 38 terminates in the rear vertical edge 40 of the stylus element.

As may be more clearly seen in FIGS. 3 and 4, a plurality of the thus described stylus elements 22 are stacked with a suitable insulation layer 42 between adjacent stylus elements. The assembly is thus bonded to form a unitary laminated stylus array. The adjacent styli are separated from each other by the thickness of the insulation layer 42. To one or the other of the two flat surfaces 34 or 38 of the individual stylus elements 22 there is secured an electrical connection lead 44. In the preferred embodiment, the electrical leads are secured to the upper flat surface 34 of alternate ones of the stylus elements 22. To the lower flat surface 38 of the intermediate stylus elements 22 the electrical connections 44 are also secured. With this arrangement, a maximum spacial separation between the individual electrical connectors is effected whereby to simplify the unique energization of the individual stylus elements 22.

To the upper curved surface of the stylus array, there is secured an insulating layer 46. Along the bottom edge defined as the reference plane 30 there is a further insulating layer 48. The insulating layer 48 comprises a low friction surface for engagement with the upper surface of the record member 14 as may be seen in FIG. 1. Additionally, the stylus array is spring biased into engagement with the upper surface of the record member 14 as by a spring 50 schematically represented in FIG. 1.

With the spring 50 biasing the stylus array into contact with the upper surface of the record member 14, the insulating layer 48 comprises a spacer of predetermined dimension to hold the tips of the electrical styli in a constant position relative to the surface of the record member 14. The maintaining of the constant position of the styli relative to the surface of the record member 14 permits, as was previously noted a high order of lateral definition of the ultimate record. The insulating layer spacer 48 is preferably formed of a low friction substance such as teflon.

The insulating layer 46 on the top surface of the stylus array 22 serves to insulate the individual styli from those portions of the toner strings which are not a part of the dynamic bridge 20 itself. As may be seen, the upper insulating layer 46 and the lower insulating layer or spacer 48 do not extend all the way to the forward edge of the stylus members 22, allowing the tips of those stylus members to be exposed. These exposed tips 28 of the stylus members are physically engaged by the toner particles in the dynamic bridge 20. Since the toner particles are electronically conductive the physical engagement of those toner particles with the pole tips 28 allow electrical charges to be transmitted from the signal source 28 through the styli 22 to the toner particles of the bridge 20 next to the dielectric surface of the record member 14, thus effecting a recording of signals emitted by the signal source 26.

Thus there has been provided, in accordance with the present invention, an improved stylus array for assembly useful in electrographic recording apparatus which provides improved stylus structure with improved stability of the structure itself and a stability of the positioning of the styli relative to the record medium, and provides an improved means for effecting electrical connection to each of the separate styli in the array.

The embodiments of the present invention in which an exclusive property or privilege is claimed are defined as follows:

1. A stylus array for electrographic recording apparatus, said stylus array comprising:
   a plurality of stylus elements, each of said stylus elements being formed of thin, flat electrically conductive material;
   each of said stylus elements being contoured to have a narrow forward operating tip, a lower edge defining a reference plane, an upper edge tapering from said operating tip away from said reference plane to a first level a first distance from said reference plane and having a stepped rear edge defining a second level a second distance from said reference plane;
   said plurality of stylus elements being laminated and having an electrically insulating layer between adjacent stylus elements forming a unitary stylus array;
   electrical connection means secured to said first level of alternate ones of said stylus elements in said array and further electrical connection means secured to said second level of the intermediate ones of said stylus elements in said array.

2. A stylus array for electrographic recording apparatus, said stylus array comprising:
   a plurality of stylus elements, each of said stylus elements being formed of thin, flat electrically conductive material;
   each of said stylus elements being contoured to have a narrow forward operating tip, a straight, flat lower edge defining a reference plane, an upper edge tapering away from said reference plane to an upper flat edge substantially parallel to said reference plane and a stepped rear edge defining a second flat edge substantially parallel to said reference plane;
   said plurality of stylus elements being laminated and having an electrically insulating layer between adjacent stylus elements forming a unitary stylus array;
   electrical connection means secured to said upper flat edge of alternate ones of said stylus elements in said array and further electrical connection means secured to said second flat edge of the intermediate ones of said stylus elements in said array.

3. A stylus array as set forth in claim 2 wherein said tapered upper edge is in the form of a concave curve.

4. A stylus array as set forth in claim 2 and further including a second electrically insulating layer secured to said straight flat lower edge, said second insulating layer comprising a spacer for maintaining a constant spacing between said stylus element operating tips and an associated record member.

5. A stylus array as set forth in claim 4 and including bias means for so biasing said stylus array that said spacer engages the surface of the associated record member.

6. A stylus array as set forth in claim 5 wherein said second insulating layer is formed of a low friction material.

7. A stylus array as set forth in claim 4 wherein a third electrically insulating layer is secured to said upper tapering edge.

8. A stylus array as set forth in claim 7 wherein said second insulating layer and said third insulating layer leave said narrow forward operating tips of said stylus elements exposed.

* * * * *